May 28, 1968 M. W. HUTCHINSON 3,386,007
MULTI-SHOT VOLTAGE SENSITIVE SWITCH FOR PROTECTING COMPONENTS
OR CIRCUITS SUBJECT TO VARIABLE VOLTAGE CONDITIONS
Filed July 22, 1965 2 Sheets-Sheet 1
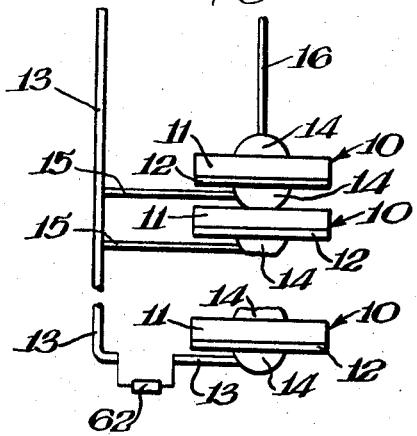
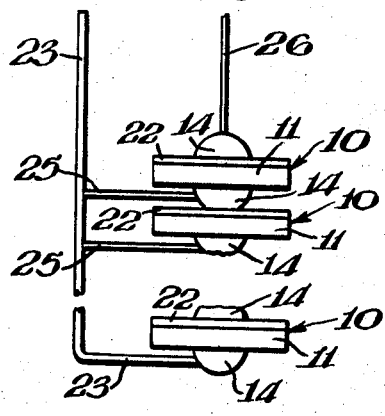
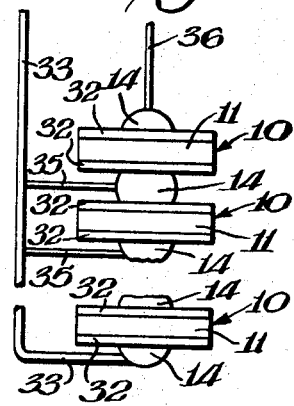
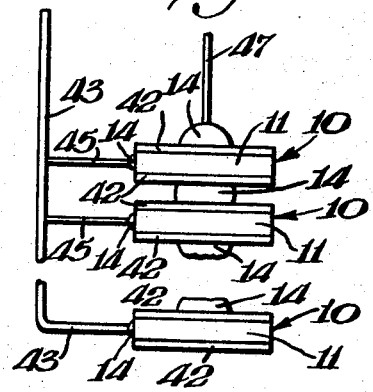
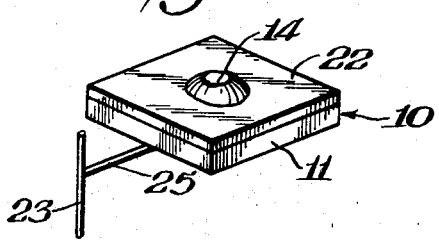
INVENTOR
Michael W. Hutchinson
BY Connolly and Hutz
ATTORNEYS May 28, 1968   M. W. HUTCHINSON   3,386,007
MULTI-SHOT VOLTAGE SENSITIVE SWITCH FOR PROTECTING COMPONENTS
OR CIRCUITS SUBJECT TO VARIABLE VOLTAGE CONDITIONS
Filed July 22, 1965   2 Sheets-Sheet 2

INVENTOR
Michael W. Hutchinson

BY Connolly and Hutz
ATTORNEYS

United States Patent Office 3,386,007
Patented May 28, 1968

3,386,007
MULTI-SHOT VOLTAGE SENSITIVE SWITCH FOR PROTECTING COMPONENTS OR CIRCUITS SUBJECT TO VARIABLE VOLTAGE CONDITIONS
Michael W. Hutchinson, North Adams, Mass., assignor to Sprague Electric Company, North Adams, Mass., a corporation of Massachusetts
Filed July 22, 1965, Ser. No. 473,927
5 Claims. (Cl. 317—40)

ABSTRACT OF THE DISCLOSURE

A plural response voltage sensitive protection device having a series of valve metal substrates having an oxide layer on at least one surface; a nonfusible lead contacting the last valve metal-oxide member; the other members having a fusible lead contacted thereto; another nonfusible lead contacting the first valve metal-oxide member; and each valve metal-oxide member being in electrical contact with an adjacent member.

The present invention relates to a protective device for an electrical component or an electrical circuit. More particularly it relates to a multi-shot voltage sensitive switch for protecting components or circuits subject to variable voltage conditions.

Individual electrical components usually can withstand moderate overvoltages or large transient voltages of e.g. about 150% of the normal voltage for short periods of time without damage. They cannot withstand higher surges, such as above 250% of the normal voltage, and therefore, some protection must be afforded them.

A voltage sensitive switch is described in a paper by K. O. Otley et al. in the Proceedings of the IRE, vol. 46, No. 10, October 1958. This switch basically has the structure of a capacitor in that it comprises two conductive layers separated by a dielectric oxide. Unlike a capacitor, however, this unit functions at the voltage at which the dielectric film breaks down. This device is a one-time-use switch, since after the breakdown of the dielectric the electrodes are in electrical communication.

It is an object of the present invention to provide a multi-shot protection device.

Another object is to provide a novel multiple switch capable of protecting a component or circuit a number of times.

Other objects and advantages of the present invention will be made obvious to those skilled in the art by the following description when considered in relation to the accompanying drawing of which:

FIGURE 1 is a side view of one embodiment of the device of the present invention.

FIGURE 2 is a side view of another embodiment of the present invention.

FIGURE 3 is a side view of yet another embodiment of the invention.

FIGURE 4 is a side view of still another embodiment of the invention.

FIGURE 5 is a perspective view of one segment of the device of FIGURE 2.

Figure 6:
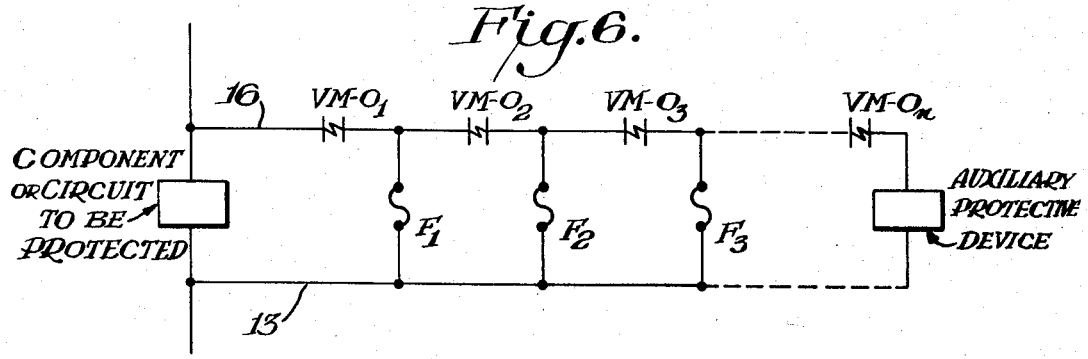
FIGURE 6 illustrates circuitry utilizing the protective device of the present invention.

In accordance with the present invention there is provided a plural response voltage sensitive protection device comprising: a series of valve metal-oxide members, said members each being composed of a valve metal substrate having an oxide layer disposed on at least one of the surfaces thereof. A first nonfusible lead is in electrical communication with one surface of the last valve metal-oxide member of the series. The other members of the series each have a fusible conductive body in electrical communication with one surface thereof and with said nonfusible lead. A second nonfusible lead is in electrical communication with a surface of the first valve metal-oxide member of the series so as to have at least one oxide layer between it and the first fusible conductive body. Each valve metal-oxide member being in electrical communication with a surface of an adjacent member so that each fusible conductive body will open upon breakdown of its preceeding oxide layer.

Referring to the drawing, FIGURE 1 shows a series of valve metal-oxide members 10. These members are composed of a valve metal substrate 11 and a dielectric oxide 12 formed on one side thereof. A nonfusible lead 13 is in electrical communication with the oxide layer 12 of the last valve metal-oxide member of the series via conductive material 14. Fusible leads 15 are in electrical communication via conductive material 14 with the oxide layers 12 of the other members of the series. The conductive material 14 also makes contact with the valve metal substrate 11 of an adjacent member 10. Each fusible conductive lead 15 is connected to the nonfusible lead 13. A second nonfusible lead 16 is connected to the valve metal substrate 11 of the first valve metal-oxide member of the series via conductive material 14. Nonfusible lead 13 is interrupted by an auxiliary protective device or a signal device 62.

FIGURE 2 shows a series of valve metal-oxide members 10 in reverse position to those of FIGURE 1. These members are composed of a valve metal substrate 11 and a dielectric oxide 22 formed thereon. A nonfusible lead 23 is in electrical communication with the valve metal substrate 11 of the last valve metal-oxide member of the series via conductive material 14. Fusible leads 25 are in electrical communication via conductive material 14 with the valve metal substrate 11 of the other members of the series. The conductive material 14 also makes contact with dielectric oxide 22 of an adjacent member 10. Each fusible conductive lead 25 is connected to the nonfusible lead 23. A second nonfusible lead 26 is in electrical communication with the oxide layer 22 of the first valve metal-oxide member of the series via conductive material 14.

FIGURE 3 illustrates a variation employing two dielectric oxide layers. The valve metal-oxide members 10 are composed of a valve metal substrate 11 having a pair of dielectric oxide layers 32 formed on opposite surfaces thereof. A nonfusible lead 33 is in electrical communication with one of the oxide layers 32 of the last valve metal-oxide member of the series via conductive material 14. Fusible leads 35 are in electrical communication via conductive material 14 with one of the oxide layers 32 of the other members of the series. The conductive material 14 also makes contact with an oxide layer 32 of an adjacent member 10. Thus, the fusible lead is in effect imbedded in the conductive material and sandwiched between two oxide layers. Each fusible conductive lead 35 is connected to the nonfusible lead 33. A second nonfusible lead 36 is in electrical communication with one of the oxide layers 32 of the first valve metal-oxide member of the series via conductive material 17. This oxide layer is opposite the oxide layer to which the first fusible lead is connected.

FIGURE 4 illustrates another modification wherein the valve metal substrate is oxide formed on both sides and the fusible lead is in electrical communication with the substrate. The valve metal-oxide members 10 are composed of a valve metal substrate 11 having a pair of oxide layers 42 formed on opposite surfaces thereof. A non-fusible lead 43 is in electrical communication with the valve metal substrate 11 of the last valve metal-oxide member of the series via conductive material 14. Fusible leads 45 are in electrical communication via conductive material 14 with the valve metal substrates 11 of the other members of the series. A conductive material 14 places the oxide layers 42 of adjacent valve metal-oxide members in electrical communication. Each fusible conductive lead 45 is connected to the non-fusible lead 43. A second nonfusible lead 47 is in electrical communication with one of the oxide layers 42 of the first valve metal-oxide member of the series via conductive material 14. This oxide layer is opposite an oxide layer which is in electrical communication with an oxide layer of an adjacent member.

FIGURE 5 is intended to illustrate the second valve metal-oxide member 10 of FIGURE 2 and its fusible lead 25 inter-communicating substrate 11 and nonfusible lead 23.

The scope of the plural response voltage sensitive protective circuit, as illustrated in FIGURE 6, can be defined in the following manner. The circuit comprises a series of voltage sensitive, normally open switches. A first nonfusible lead is in electrical communication with one element of the last switch of said series. The other switches of the series each have a fusible conductive body in electrical communication with one element thereof. Each fusible conductive body is also connected to said nonfusible lead. A second nonfusible lead is in electrical communication with one element of the first switch of the series and the other element of said first switch is in electrical communication with the first fusible conductive body. Each switch is in electrical communication with an element of an adjacent switch so that each fusible conductive body will open upon closure of its preceding switch.

The function of the several devices will be described in conjunction with FIGURE 6 which illustrates equivalent circuitry of the device of the present invention. Assume that the component or circuit to be protected can operate below 15.0 volts, but will be incapable of maximum operating efficiency or destroyed if subjected to a voltage of 15.1 or greater for longer than $t$ time. Assume further that a voltage surge of 15.5 volts lasting for 20 microseconds occurs periodically. A device such as that illustrated in FIGURE 1 is selected and inserted across the component or circuit to be protected as shown in FIGURE 6. The device comprises a plurality of valve metal-oxide members (VM–$O_1$, VM–$O_2$, VM–$O_3$ . . . VM–$O_n$) and a plurality of fusible leads ($F_1$, $F_2$, $F_3$, etc.) The dielectric oxide of the device, which withstands the normal associated circuit voltage, is designed to break down rapidly when subjected to a voltage greater than 15 volts. Assume $F_1$, which corresponds to 15, the first fusible lead in FIGURE 1, is designed to fuse open when subjected to a current of 2 amperes for a period of 0.5 second which is greater than the time to render the protected device inoperative. The other fusible members have the same characteristics as $F_1$.

The component or circuit to be protected, connected as shown in FIGURE 6, is placed in operation below 10.0 volts and VM–$O_1$ withstands this voltage. Assume a voltage surge of 15.5 volts of 20 microseconds duration is then created in the line. The oxide of $VM_1$–$O_1$ breaks down rapidly within the 20 microsecond period and this part and of the device acts as a closed switch. The voltage shorts through VM–$O_1$ and is shunted through $F_1$ to lead 13. The current flows through $F_1$ for about 0.5 second at which time it fuses open. Since the voltage sensitive protective device is in parallel with the component or circuit to be protected, the energy of the transient will be dissipated in or bypassed through the protective network. By this time the comparatively short-duration voltage surge has passed and VM–$O_2$ functions to withstand the normal associated circuit voltage, and the protective device now acts as an open switch.

If the voltage surge had been of longer duration than the fusion time of $F_1$, then VM–$O_2$ would have in effect switched closed and $F_2$ would act as a shunt across the protected device until the current fused it open. Thereafter, VM–$O_3$ would withstand the associated circuit voltage and the circuit or component would return to normal operation. At VM–$O_n$ a transient voltage greater than 15.0 will cause VM–$O_n$ to short and a suitable auxiliary protective device in series with VM–$O_n$ will indicate that the last member of the protection device has shorted. The auxiliary protective device can be a lamp, circuit breaker, etc. The circuit or component to be protected will remain inoperative or will operate at reduced efficiency until the multi-short protection device is replaced and if necessary the auxiliary protective device or devices are reset.

Referring again to FIGURE 1, the voltage and current takes the following path. The voltage is held back by oxide 12 until its voltage breakdown point is reached. The low impedance resulting allows the current to flow through 15 until it fuses open. If the voltage surge continues or when another occurs, the next oxide layer breaks down and the current is shunted through the next fusible member 15. This process continues until the last member provides a low impedance path from lead 16 to lead 13 via some suitable auxiliary device.

The device of FIGURE 2 operates in the same manner as that of FIGURE 1. In FIGURE 3 it will be noted that two oxide layers 32 must be broken down before the current is shunted through fusible lead 35.

In FIGURE 4, the first oxide layer 42 will break down and the current shunted through the first fusible member 45. After 45 fuses open, two adjacent oxide layers 42 must break down before the current will be shunted through the next fusible member.

Figure 7:
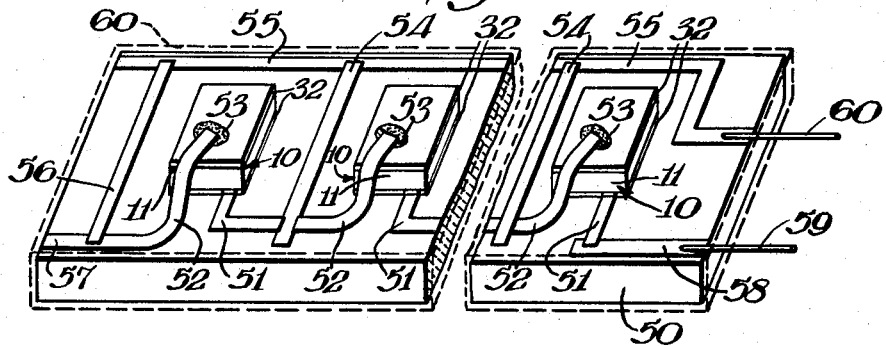
FIGURE 7 is a broken perspective view of a device within the scope of the present invention.

In FIGURE 7 there is depicted a series of members and their fusible leads mounted on an insulating body. In this embodiment an insulating body 50 has a plurality of valve metal-oxide members 10 mounted thereon. As in FIGURE 3, the members are composed of a valve metal substrate 11 and a pair of dielectric oxide layers 32 formed on opposite sides thereof. The device, however, utilizes only one of the layers 32 of each member since nonfusible leads 51 are in electrical communication with substrate 11. The valve metal foil is anodized on both sides because it is more economical and practical to do so even if only one oxide layer is to be utilized. Therefore, lead 51 would, for example, be welded through the unwanted oxide layer directly to the valve metal substrate. Another series of nonfusible leads 52 are in electrical communication via conductive material 53 with the oxide layer 32 which will be employed to withstand the associated circuit voltage. Fusible leads 54 are connected to a nonfusible conductive lead 55. The other end of the fusible leads 54 are connected to nonfusible leads 52. Another nonfusible lead 56 is in electrical communication with the nonfusible lead 52 of the last member of the series via conductive path 57. The other end of nonfusible lead 56 is in contact with lead 55. Lead 56 may be replaced by an auxiliary protective device or signal device. A conductive path 58 interconnects the first nonfusible lead 51 with terminal wire 59. Terminal wire 60 is connected to nonfusible lead 55. An insulating covercoat shown by dash line 61 protects the device.

The phrase "valve metal-oxide member" means a unit composed of a valve metal substrate having an oxide layer disposed on at least one of the surfaces thereof. The substrate can be of any shape and any dimension. The oxide layer can cover a large area or a comparatively small area. The thickness of the oxide will be determined by the characteristics of the circuit or component to be protected and the firing characteristics desired.

A preferred form of the substrate is that of a foil which has an oxide layer on both sides rather than on just one. From a practical standpoint, as indicated above, it is far easier to anodize a foil on both sides rather than just one. If only one of the two oxide layers is to be employed, there is no difficulty in attaching a lead, as by welding, through the unwanted oxide layer.

As will be appreciated in the case of a valve metal foil substrate, the thickness is small in comparison to the planar dimensions. The areas of the substrate or the oxide layer are not electrically significant as in the case of a capacitor but may effect either the open or closed state of the switch as well as its transition behavior. The respective areas will be dictated mainly by factors such as ease of handling during assembly versus space limitations. The overall volume of the device will be determined by the number of valve metal-oxide members employed. This number is necessarily indefinite in that it may be any number of two or more, depending upon the frequency of potentially damaging voltage surges in any particular circuit and the measure of protection the customer desires relative to cost.

Any of the common valve metals, aluminum, tantalum, niobium, etc.; can be employed herein. The dielectric oxide layer or layers can be applied by any means known to the art. They are most conveniently formed by electrolytic means. The conductive material employed herein can be any of the common prior art: epoxies, pastes, paints, solders, etc.

The term "fusible" conductive body or lead as used herein means any conductive material of a predetermined size and shape which will melt and therefore become physically disrupted when subjected to the current associated with the circuit or component to be protected. Nichrome wire is a good example of a fusible material. For example, a Nichrome wire having a resistance of 27 ohms per foot, 2 inches long and having a diameter of .005 inch will open when subjected to 2 amperes for a period of 2 seconds. It is to be understood that other material can be used to advantage. The fusible lead is so selected that its time to open will be longer than the longest expected voltage transient in the circuit.

The nonfusible leads can be any of the commonly employed lead materials which will not melt under the same conditions calculated to open the fusible material. For example, copper, silver, nickel, etc. may be employed.

The oxide layers of the valve metal-oxide members of the device should be all of the same formation voltage. The voltage rating used should be quite close to the normal operating voltage of the component or circuit to be protected in order to achieve fast firing of the individual VM–O members. On the other hand, the rated voltage should be high enough to insure "no fire" conditions on life in the environment of the circuit.

Since it is obvious that many changes and modifications may be made in the above-described details without departing from the nature and spirit of the invention, it is to be understood that the invention is not limited to said details except as set forth in the appended claims.

What is claimed is:

1. A plural response voltage sensitive protection device comprising:
   (a) a series of valve metal-oxide members, said members each composed of a valve metal substrate having an oxide layer disposed on at least one of the surfaces thereof;
   (b) a first nonfusible lead in electrical communication with one surface of the last valve metal-oxide member of the series;
   (c) the other members of the series each have a fusible conductive body in electrical communication with one surface thereof;
   (d) each fusible conductive body is also connected to said nonfusible lead;
   (e) a second nonfusible lead in electrical communication with a surface of the first valve metal-oxide member of the series so as to have at least one oxide layer between it and the first fusible conductive body; and
   (f) each valve metal-oxide member being in electrical communication with a surface of an adjacent member so that each fusible conductive body will open upon breakdown of its preceding oxide layer.

2. A plural response voltage sensitive protection device comprising:
   (a) a series of valve metal-oxide members, said members each composed of a valve metal substrate having an oxide layer disposed on one side thereof;
   (b) a first nonfusible lead in electrical communication with the oxide layer of the last valve metal-oxide member of the series;
   (c) the other members of the series each have a fusible conductive body in electrical communication with the oxide layer thereof;
   (d) each fusible conductive body is also connected to said nonfusible lead;
   (e) a second nonfusible lead in electrical communication with the valve metal substrate of the first valve metal-oxide member of the series; and
   (f) the oxide layer of each successive valve metal-oxide member being in electrical communication with the valve metal substrate of the next adjacent member.

3. A plural response voltage sensitive protection device comprising:
   (a) a series of valve metal-oxide members, said members each composed of a valve metal substrate having an oxide layer disposed on one side thereof;
   (b) a first nonfusible lead in electrical communication with the valve metal substrate of the last valve metal-oxide member of the series;
   (c) the other members of the series each have a fusible conductive body in electrical communication with the valve metal substrate thereof;
   (d) each fusible conductive body is also connected to said nonfusible lead;
   (e) a second nonfusible lead in electrical communication with the oxide layer of the first valve metal-oxide member of the series; and
   (f) the valve metal substrate of each successive valve metal-oxide member being in electrical communication with the oxide layer of the next adjacent member.

4. A plural response voltage sensitive protection device comprising:
   (a) a series of valve metal-oxide members, said members each composed of a flat valve metal substrate having first and second oxide layers disposed on opposite sides thereof;
   (b) a first nonfusible lead in electrical communication with the second oxide layer of the last valve metal-oxide member of the series;
   (c) the other members of the series each have a fusible conductive body in electrical communication with the second oxide layer thereof;
   (d) each fusible conductive body is also connected to said nonfusible lead;
   (e) a second nonfusible lead in electrical communication with the first oxide layer of the first valve metal-oxide member of the series; and
   (f) the second oxide layer of each successive valve metal-oxide member being in electrical communication with the first oxide layer of the next adjacent member.

5. A plural response voltage sensitive protection device comprising:
   (a) a series of valve metal-oxide members, said members each composed of a flat valve metal substrate having first and second oxide layers disposed on opposite sides thereof;
   (b) a first nonfusible lead in electrical communication with the valve metal substrate of the last valve metal-oxide member of the series;
   (c) the other members of the series each have a fusible conductive body in electrical communication with the valve metal substrate thereof;

(d) each fusible conductive body is also connected to said nonfusible lead;

(e) a second nonfusible lead in electrical communication with the first oxide layer of the first valve metal-oxide member of the series; and (f) the second oxide layer of each successive valve metal-oxide member being in electrical communication with the first oxide layer of the next adjacent member.

References Cited

UNITED STATES PATENTS

| | | | |
|---|---|---|---|
| 3,213,345 | 10/1965 | Loftus | 317—40 X |
| 3,262,018 | 7/1966 | Bogaerts et al. | 317—29 X |
| 3,312,863 | 4/1967 | Muldoon | 317—16 X |

MILTON O. HIRSHFIELD, *Primary Examiner.*

R. V. LUPO, *Assistant Examiner.*